Patented Nov. 7, 1950

2,529,446

UNITED STATES PATENT OFFICE 2,529,446

GUM GUAIAC TREATMENT

Howard C. Black, Chicago, Ill., assignor to Swift & Company, Chicago, Ill., a corporation of Illinois No Drawing. Application July 2, 1948, Serial No. 36,801

12 Claims. (Cl. 99—163)

The present invention relates to the stabilizing of fatty materials designed for subsequent use as a shortening and, more particularly, to such a stabilization wherein discoloration in the use of the shortening is prevented.

In recent years, gum guaiac has come into common usage as a stabilizing agent for fatty material and is recognized as having excellent properties in this regard. This use of gum guaiac is disclosed and claimed in United States Patent 1,903,126.

Furthermore, an improved method has been developed for overcoming the difficulties presented by the problem of effectively dispersing gum guaiac uniformly throughout the fatty material because of its sparing solubility in the same. This method disclosed and claimed in United States Patent 2,308,912 comprises first dissolving the gum guaiac in a low molecular weight fatty acid, such as acetic acid, prior to its incorporation in the fatty material. It is undesirable to have acetic acid remaining in the finished product, but it has been found easy to remove the same by the mere application of heat, which causes the acetic acid to readily vaporize because of its relatively low volatility. In fact, it has been found desirable to add the acetic acid solution of gum guaiac prior to the conventional deodorization step wherein the fatty material is treated with a current of steam passing through the fat at atmospheric or subatmospheric pressures at temperatures of about 100° to 200° C. so that during this deodorizing step the acetic acid is also removed, leaving the gum guaiac uniformly dispersed throughout the fatty material.

However, the above set forth procedure has the disadvantage that when the so stabilized shortenings are employed in the preparation of a dough mix, there often results an objectionable blue discoloration of the dough which impairs the appearance and salability of the baked products prepared therefrom. This characteristic blue color, the intensity of which varies and fades out after a time, is believed to result from a reaction between enzymes in the flour employed in making up the dough, peroxide in the lard, and gum guaiac, a polyphenolic compound. The enzymes present in the flour are believed to be in the nature of catalases and/or peroxidases.

Accordingly, it is a primary object of the present invention to provide a method of stabilizing a fatty material adapted for use as a shortening which will not subsequently produce an objectionable color when combined with flour to form a dough mix or batter.

In the same manner, it is an object of the present invention to provide a method of treating gum guaiac so that shortenings stabilized thereby will not produce an objectionable color reaction when mixed with flour or other enzyme-containing material.

A still further object is to provide a process for obtaining the above set forth objects in an efficient and economical manner.

In accordance with the present invention, it has been found that if gum guaiac is treated with hydrogen peroxide prior to its incorporation in the fatty material, which may be of animal or vegetable origin, no objectionable blue coloration will result when the shortening so stabilized is subsequently mixed with flour in the preparation of a dough or batter. The treatment with hydrogen peroxide may be conveniently carried out after the gum guaiac has been dissolved in a dispersing medium, such as acetic acid, but it is to be understood that the present invention is not so restricted and it is possible to treat gum guaiac while dispersed in any suitable medium or, in fact, even while in solid form. The normal concentration of gum guaiac in acetic acid prior to its dispersal in fatty materials is 25 to 40%, and this range has likewise been found to be quite suitable for treatment with hydrogen peroxide.

The concentration of hydrogen peroxide solution to be employed in the treatment is not at all critical and it has been found suitable to employ one of the standard preparations available on the open market, the hydrogen peroxide content of which is approximately 30%. In like manner, the proportion of hydrogen peroxide with respect to the gum guaiac treated is not particularly critical, but it has been found that best results are obtained when 2% to 10%, by weight, of the approximately 30% solution of hydrogen peroxide is employed based on a 30% solution of gum guaiac in glacial acetic acid.

The treatment or reaction is best carried out at a temperature of about 140° to 170° F., with a range of 150° to 160° F. being preferred. The reaction itself is exothermic in nature, and it is possible by controlling the rate of addition of hydrogen peroxide to maintain a temperature of treatment within the desired range. Such a procedure is preferred, although it is to be understood that it is contemplated within the scope of the present invention that the hydrogen peroxide may be added at a greater or lesser rate accompanied by the employment of artificial cooling or heating means as may be necessary to maintain the desired temperature range.

The time of treatment or reaction may also be varied over a rather wide range. In most instances, a reaction time of from 30 minutes to 2 hours has produced satisfactory results within the conditions of treatment outlined above, with a range of 60 to 80 minutes producing the most satisfactory results.

When the desired time of treatment has been obtained, the reaction is preferably terminated by rapidly cooling the solution. This may be conveniently accomplished by immersing the vessel in which the reaction is being carried out in cold water to rapidly reduce the temperature of the contents thereof to at least 100° F.

To demonstrate the fact that the above-outlined procedure has completely destroyed the color-forming bodies, a drop of the hydrogen peroxide treated gum guaiac solution was placed on a smear of freshly prepared flour paste prepared with a 0.1% hydrogen peroxide solution. A number of such tests were conducted, and in all instances there was a complete absence of color formation.

The following is an example of a method for treating gum guaiac according to the present invention setting forth the preferred operating conditions, but it is to be understood that the invention is not to be limited to the specific proportions or technique embodied therein.

In a stainless steel container there is added to 50 pounds of a 30% solution of gum guaiac in glacial acetic acid, 3 pounds of a 30% solution of hydrogen peroxide. The hydrogen peroxide solution is added to the gum guaiac solution at about 70° F., and the temperature is allowed to rise due to the heat of reaction to about 155° F. The rate of addition of hydrogen peroxide solution is then controlled so that the temperature does not rise substantially above this point and is never allowed to rise above 170° F. The treatment is continued for about one hour, at which time the reaction is stopped by cooling the contents of the container rapidly to about 100° F. by immersing the steel container in a body of cold water.

The treated gum guaiac was tested as outlined above by adding a drop of the same to a smear of flour paste made up with a 0.1% hydrogen peroxide solution, and there was no resulting objectionable color formation.

A stabilized fatty material, suitable for subsequent use as a shortening in the preparation of baked products, is prepared by adding a small amount of the gum guaiac treated according to the present invention. When the gum guaiac has been treated or reacted in an acetic acid solution according to the preferred procedure, it is added to the fatty material prior to the deodorizing step so that the acetic acid because of its volatile nature will be automatically removed because of the relatively high temperature prevailing during the deodorizing operation as mentioned above. The treated gum guaiac may be added in an amount corresponding to 0.02% to 0.06% of the weight of the fatty material being stabilized, but 0.04% has been found to be the most suitable proportion in most instances.

Heretofore, it has been customary to add untreated gum guaiac mixed in cold fatty material to the bulk of fatty material being processed prior to the bleaching step to stabilize the material during filtration through the filter press. In accordance with the presently disclosed process, it has been found desirable to eliminate the addition of untreated gum guaiac in the bleaching step because of the fact that it carries over untreated gum guaiac with its objectionable color-forming characteristic to the final product. Accordingly, it has been found, in accordance with the preferable procedure, to increase the amount of gum guaiac added before deodorization from 0.03% to 0.04% to compensate for the elimination of the addition of the gum in the bleaching step. It is to be understood, of course, that if economic considerations render it permissible, gum guaiac treated wtih hydrogen peroxide according to the teachings of the present invention may be added in the bleaching step; but it has been found that an excellent product results even when the addition of gum guaiac during the bleaching step is eliminated.

Obviously, many modifications and variations of the invention as hereinbefore set forth may be made without departing from the spirit and scope thereof, and therefore only such limitations should be imposed as are indicated in the appended claims.

I claim:

1. The method of treating gum guaiac to prevent color formation when said gum guaiac is employed to stabilize fatty material to be used as a shortening in the preparation of baked products, comprising: treating said gum guaiac with hydrogen peroxide at a temperature of about 140° to 170° F. whereby its potential color-forming characteristic is destroyed.

2. The method of treating gum guaiac to prevent color formation when said gum guaiac is employed to stabilize fatty material to be used as a shortening in the preparation of baked products, comprising: forming a solution of said gum guaiac, and treating said solution of gum guaiac with hydrogen peroxide while allowing the temperature to rise, due to the heat of reaction, to not in excess of about 170° F. so that the potential color-forming characteristic of said gum guaiac is destroyed.

3. The method of treating gum guaiac to prevent color formation when said gum guaiac is employed to stabilize fatty material to be used as a shortening in the preparation of baked products, comprising: forming a solution of said gum guaiac in acetic acid, and treating said solution of said gum guaiac with hydrogen peroxide within a temperature range of about 140° to 170° F. until the potential color-forming characteristic of said gum guaiac is destroyed.

4. The method of treating gum guaiac to prevent color formation when said gum guaiac is employed to stabilize fatty material to be used as a shortening in the preparation of baked products, comprising: forming a solution of said gum guaiac in acetic acid, and reacting said solution with hydrogen peroxide within a temperature range of about 140° to 170° F. for a time ranging from about 30 minutes to 2 hours until the color-forming characteristic of said gum guaiac is destroyed.

5. The method of treating gum guaiac to prevent color formation when said gum guaiac is employed to stabilize fatty material to be used as a shortening in the preparation of baked products, comprising: forming a solution of said gum guaiac in glacial acetic acid; and reacting said solution of gum guaiac with about 2 to 10% by weight of an approximately 30% solution of hydrogen peroxide, the temperature caused by said reaction being maintained below about 170° F., said reaction being continued for from about 60 to 80 minutes.

6. The method of treating gum guaiac to prevent color formation when said gum guaiac is employed to stabilize fatty material to be used as a shortening in the preparation of baked products, comprising: forming a solution of said gum guaiac in glacial acetic acid; reacting said solution of gum guaiac with about 2 to 10% by weight of an approximately 30% solution by hydrogen peroxide, the temperature caused by said reaction being maintained below about 170° F., said reaction being continued for from about 60 to 80 minutes; and terminating said reaction by suddenly cooling said solution.

7. In the method of stabilizing by the the addition of gum guaiac, a fatty material adapted for use as a shortening in the preparation of doughs, the step of treating said gum guaiac with hydrogen peroxide prior to the addition of said gum guaiac to said fatty material, said treatment being carried out at temperatures of about 150° to 160° F. whereby the formation of a blue color in said subsequently prepared dough is prevented.

8. The method of stabilizing fatty material adapted for use as a shortening to be employed in the preparation of baked products, comprising: adding a small amount of gum guaiac treated according to the method of claim 2 to said fatty material.

9. The method of stabilizing fatty material adapted for use as a shortening to be employed in the preparation of baked products, comprising: adding a small amount of gum guaiac treated according to the method of claim 3 to said fatty material.

10. The method of stabilizing fatty material adapted for use as a shortening to be employed in the preparation of baked products, comprising: adding a small amount of gum guaiac treated according to the method of claim 4 to said fatty material.

11. The method of stabilizing fatty material adapted for use as a shortening to be employed in the preparation of baked products, comprising: adding a small amount of gum guaiac treated according to the method of claim 5 to said fatty material.

12. The method of stabilizing fatty material adapted for use as a shortening to be employed in the preparation of baked products, comprising: adding a small amount of gum guaiac treated according to the method of claim 6 to said fatty material.

HOWARD C. BLACK.

No references cited.